United States Patent
Meller et al.

(10) Patent No.: US 7,854,240 B2
(45) Date of Patent: Dec. 21, 2010

(54) POLYMERIC FOAM TUBE INSULATIONS AND METHOD FOR CONTINUOUSLY PRODUCING SUCH A TUBE

(75) Inventors: Mika Meller, Rothrist (CH); Juerg Weibel, Hagendorn (CH); Stephen C. Davis, Durham, NC (US); Scott A. White, Raleigh, NC (US); Charles Princell, Graham, NC (US)

(73) Assignee: Armacell Enterprise GmbH, Muenster (DE)

( * ) Notice: Subject to any disclaimer, the term of this patent is extended or adjusted under 35 U.S.C. 154(b) by 1226 days.

(21) Appl. No.: 10/564,822

(22) PCT Filed: Jul. 18, 2003

(86) PCT No.: PCT/EP03/07814
§ 371 (c)(1),
(2), (4) Date: Jun. 13, 2006

(87) PCT Pub. No.: WO2005/014258
PCT Pub. Date: Feb. 17, 2005

(65) Prior Publication Data
US 2007/0107795 A1    May 17, 2007

(51) Int. Cl.
*F16L 9/14* (2006.01)
(52) U.S. Cl. .......................... 138/149; 138/112; 138/114
(58) Field of Classification Search ................ 138/112, 138/114, 149
See application file for complete search history.

(56) References Cited

U.S. PATENT DOCUMENTS

| | | | | |
|---|---|---|---|---|
| 3,012,923 A | * | 12/1961 | Slayter | 156/62.2 |
| 3,436,442 A | | 4/1969 | Saks | |
| 3,934,064 A | * | 1/1976 | Lowthian | 428/34.5 |
| 3,948,295 A | * | 4/1976 | Lemont et al. | 138/147 |
| 4,128,678 A | * | 12/1978 | Metcalfe et al. | 428/119 |
| 4,192,352 A | * | 3/1980 | Hakamada et al. | 138/149 |
| 4,452,279 A | * | 6/1984 | Atwell | 138/126 |
| 4,667,390 A | * | 5/1987 | Acharya et al. | 29/455.1 |
| 4,823,845 A | * | 4/1989 | Martin et al. | 138/149 |
| 4,931,326 A | * | 6/1990 | Weil | 428/35.8 |
| 6,167,915 B1 | * | 1/2001 | Collie et al. | 138/114 |
| 2002/0092577 A1 | * | 7/2002 | Vitoorapakorn | 138/149 |
| 2003/0234058 A1 | * | 12/2003 | Tippins | 138/149 |

FOREIGN PATENT DOCUMENTS

| | | |
|---|---|---|
| DE | 196 35 214 A1 | 3/1998 |
| EP | 0162645 A | 11/1985 |
| EP | 1 208 962 A1 | 5/2002 |

* cited by examiner

*Primary Examiner*—James F Hook
(74) *Attorney, Agent, or Firm*—Rothwell, Figg, Ernst & Manbeck, P.C.

(57) ABSTRACT

The foam tube for pipe insulations has an external surface and an internal surface. The internal surface is provided with an adhesively bonded layer of fibers. The fibers are a material having a melt temperature that is higher than that of the polymeric foam. The fibers are adhesively bonded to the internal surface such as to stand up from the internal surface. The fibers are substantially uniformly distributed over the internal surface providing a surface coverage of 2 to 20 percent. Further, the fibers have a linear density of 0.5 to 25 dtex and a length of 0.2 to 5 mm. With this fiber layer the polymeric foam tube has an improved thermal resistance and thermal conductivity.

4 Claims, 1 Drawing Sheet

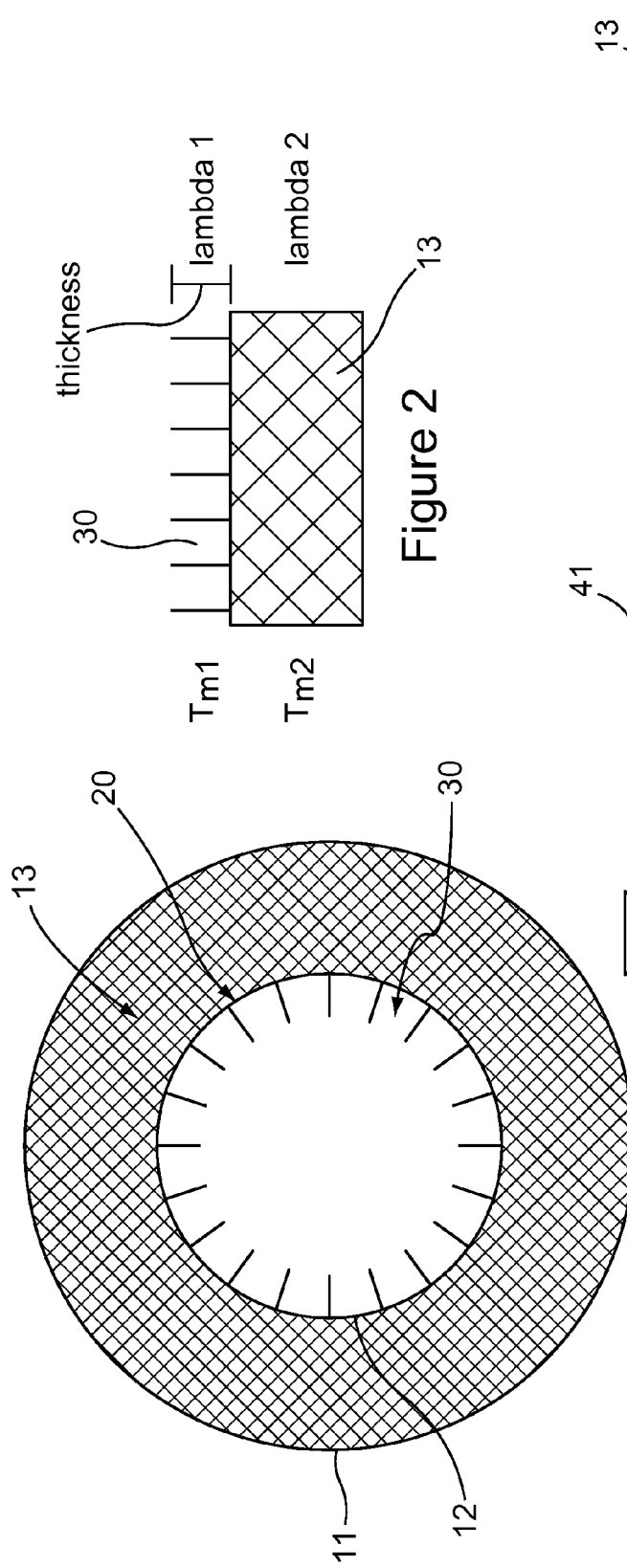
Figure 1
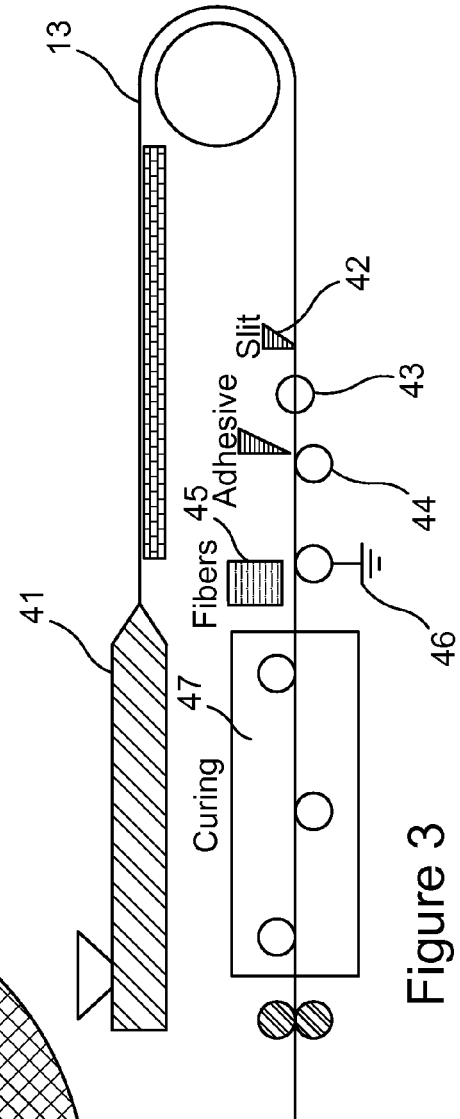
Figure 2
Figure 3

US 7,854,240 B2

POLYMERIC FOAM TUBE INSULATIONS AND METHOD FOR CONTINUOUSLY PRODUCING SUCH A TUBE

CROSS-REFERENCE TO RELATED APPLICATION

This application is a National Phase of International Application Serial No. PCT/EP2003/007814, filed Jul. 18, 2003.

BACKGROUND OF THE INVENTION

1. Field of the Invention

The invention relates to polymeric foam tube for pipe insulations, wherein the tube has an external surface and internal surface the latter being provided with an adhesively bonded additional layer.

2. Description of the Background Art

The invention further relates to a method for continuously producing a polymeric foam tube for pipe insulations, wherein the polymeric foam tube is extruded providing an external and an internal surface, the extruded tube is axially slit from its external surface to its internal surface, the slit tube is spread to the shape of a plate, an adhesive layer is applied to the exposed internal surface of the tube spread to the shape of a plate, an additional layer is applied to the adhesive layer and bonded thereto, and the spread tube is returned into its tube shape before being slit with closing the axial slit of the tube coated with the adhesive layer and the additional layer.

Such a polymeric foam tube and method for its continuous production is disclosed in EP 1 208 962 A1. The additional layer consists of a material acting as a sliding layer, if a pipe is inserted into the insulation tube. The additional layer can be re-enforced by fibers or can consist of a foamed sheet material, for example polypropylene.

According to the above-mentioned steps of production, the tube with the additional layer on its internal surface has in its final state an optimal connection of the slit faces, which faces are connected by welding or bonding, wherein the tube has the same original shape as when the faces where slit or cut.

Polymeric insulation foams may be produced in numerous ways, of which foam extrusion is one of the most widely used, and known, technologies. Foaming in an extrusion may be the result of either a physical or a chemical blowing process. In the physical blowing process, a volatile gas is mixed with a polymer, and the mixture expands rapidly as it exits the extruder to the ambient pressure. In the chemical blowing process, the volatile gas is formed by chemical reaction, which may be a result of degradation of an additive, or directly caused by the polymerisation reaction.

One of the drawbacks of polymeric foams is the thermal resistance of it. Typically all foams collapse close to the melting point of the matrix polymer, and therefore they are very limited in terms of service temperature. In pipe insulation, the critical point is the contact to the pipe, and if this contact could be diminished, an improved thermal resistance would be obtained. In such a case it is necessary that the layer that is used to insulate the pipe from the foam has a high thermal resistance and a low thermal conductivity. By definition high thermal resistance is needed, and here a selection of layer material plays an important role. A low thermal conductivity on the other hand is not an easy task, since the thermal conductivities of typical materials are much higher than desired.

Also, in the case of certain foam-pipe combinations, for example polypropylene and copper (Cu), degradation of the foam may be observed due to chemical reaction at the interface.

DE 196 35 214 A1 discloses a multi-layered sheet insulating material for heat insulation and sound proofing. The material has at least two separation layers made of a flexible material, such as sheets, non-woven fabric, paper or the like, and spacer elements between the separation layers. The spacer elements are formed by spacer fibers which are oriented perpendicular to the separation layers. The one ends of the spacer fibers are adhesively bonded to a separation layer in bunches of parallel fibers, which bunches are arranged in a distance to each other and according to a prescribed pattern. The other ends of the spacer fibers contact the other separation layer which rests on the other fiber ends. The function of the fibers is to maintain the distance between the two separation layers under the condition to keep heat conduction between the two separation layers as near as possible to that of the included air.

SUMMARY OF THE INVENTION

It is the object of the invention to provide a preferably continuously produced polymeric foam tube for pipe insulations having an improved thermal resistance and thermal conductivity and being able to take up pipe insulations within a predetermined range of outer diameters.

This object is obtained with the polymeric foam tube of the generic kind in that the additional layer is a layer of fibers which comprise or consist of a material having a melt temperature that is higher than that of the polymeric foam, which are adhesively bonded to the internal surface such as to stand up from the internal surface, which are substantially uniformly distributed over the internal surface providing a surface coverage of 2 to 20 percent, preferably 4 to 10 percent, and which have a linear density of 0.5 to 25 dtex and a length of 0.2 to 5 mm.

The object is obtained with the method of the generic kind in that the additional layer is made of fibers having a linear density of 0.5 to 25 dtex, a length of 0.2 to 5 mm, and a melt temperature that is higher than that of the polymeric foam, by setting the exposed internal surfaces of the spread tube to a ground potential and by electrostatically charging the fibers such that their one ends stick to the adhesive layer with a uniform surface coverage of 2 to 20 percent, preferably 4 to 10 percent, while their other ends stand up therefrom.

Preferably the fibers extend substantially in a radial direction from the internal surface.

Advantageously the fibers are polymeric fibers and may comprise or consist of polyamide or polypropylene, while on the other hand viscose, aramid, glass or carbon fibers can also be used.

The polymeric foam tubes can be made of thermoplastic, thermoset or elastomeric resins.

The polymeric foam tube according to the invention has superior properties when compared to a standard polymeric foam product, and is targeted to be used for pipe insulation. For example the thermal conductivity (lambda-value) is lower, the product can withstand much higher pipe temperatures, and it is easy to install. Furthermore, by preparing the additional layer with careful selection of fiber diameter and length, the product may be used also for various sizes of pipes because of compressibility of the inner layer.

The tube is made of typical polymeric foam, which is extruded using a common foam extrusion equipment. Then in an on-line process the extruded foam tube is slit and folded open, and an adhesive is applied onto the inside surface. Directly afterwards electrically charged, short and thin polymer fibers are introduced to the adhesive. Upon the cure of the adhesive, the fibers are permanently attached to the insulation tube with their one ends and stand up form the surface.

As the surface of the tube is only partially covered with the fibers, the inner layer is mostly air. The thermal conductivity of this layer is below that of the insulation tube, hence decreasing the thermal conductivity value of the insulation tube. Furthermore, since the small fibers are made of a material, preferably polymeric, having a high melt temperature, and the thermal conductivity being low, the service temperature is significantly increased from that of the general insulation foam.

The adhesive layer can be any kind of pressure sensitive adhesive, for example a hot-melt type of adhesive or a dispersion glue, and it is considered insignificant in terms of its contribution of thickness and major properties.

BRIEF DESCRIPTION OF THE DRAWINGS

By way of example the invention is further described referring to the accompanying drawings in which FIG. 1 shows a cross section of a polymeric foam tube according to the invention, FIG. 2 depicts in a graph the effect of thickness of the fiber layer on the total thermal conductivity of the polymeric foam tube according to the invention and FIG. 3 shows a flow scheme of the method for continuously producing a polymeric foam tube according to the invention.

DETAILED DESCRIPTION OF THE INVENTION

FIG. 1 shows an elastomeric tube 13 of a polymeric foam having a external surface 11 and an internal surface 12. On the internal surface 12 a thin adhesive layer 20 is provided which holds the one ends of fibers of a fiber layer 30. The fibers extend substantially radially from the adhesive layer. The referred fibers are polymeric fibers, the melt temperature of which is higher than that of the polymeric foam. The fibers are elected for a substantially similar linear density and length and cover the internal surface 12 with the adhesive layer 20 in a uniform distribution over the surface with a coverage of 2 to 20 percent, if the whole internal surface 12 is 100 percent.

As shown in FIG. 3, the insulation tube 13 is made of a polymeric foam and in an on-line process. The extruded (41) tube-like product is first slit (42) and folded open (43), after which an adhesive is supplied (44) onto the internal surface 12 with specially designed glue equipment. Shortly afterwards in the on-line direction short and thin polymer fibers are first electrically charged (45) after which they are drawn to the surface of the adhesive covered foam which acts as a ground for electricity (46). Upon the cure (47) of the adhesive, the fibers are permanently attached to the insulation tube. Due to the electric charge the fibers are evenly placed over the surface bonded with their one ends by the adhesive and extending with their other ends substantially vertical to the surface of the adhesive covered foam which becomes a radial direction, if the folded open (43) tube is returned to its original shape. This step is carried out after curing (47) and is not shown in FIG. 3. The recovery of the tube shape along the slit or cut through faces is described in EP 1 208 962 A1. The surface coverage of the fibers is in the range from 2 to 10 percent. The degree of coverage is defined based on the desired properties of the product and on the type of fiber selected.

The adhesive is a solvent based commercial spray glue and the fibers have 6,6 dtex and a length of 1.0 mm. Both, a virgin sample and a fiber covered sample were measured for an average thermal conductivity value. Table 1 shows the result from this test.

TABLE 1

Thermal conductivity of a virgin elastomeric sheet compared with a sheet of the invention after curing (47).

| Sample type | Thickness of foam | Thickness of fiber layer | Total Thickness | Thermal Conductivity | Thermal Coefficient |
|---|---|---|---|---|---|
| Elastomeric foam | 25.4 mm | — | 25.4 mm | 0.0382 | 0.265 |
| Inventive product | 25.4 mm | 1.0 mm | 26.4 mm | 0.0368 | 0.255 |

It is shown that the average thermal conductivity of the sheet is decreased when such a layer is used inside the tube, in this case it is decreased by 0.0014 W/m²K. However one has to take into account the experimental error which is about 0.006 in this case, so before further testing it is difficult to predict how much the thermal conductivity will be improved with longer and thicker fibers. The effect of thickness and length, as well as that of the degree of coverage, is also to be included. It is assumed that most of the effect comes from synergism between insulation and the fiber layer, because the layer alone has been shown to have thermal conductivity of about 0.030 W/m²K. In this case the value for the layer appears to be closer to 0.010 to 0.15 W/m²K. The system is considered to have two different material layers of different material properties, namely lambda 1 and lambda 2 in FIG. 2, and thicknesses. The thickness of the fiber layer 30 in FIG. 2 is considered equal to the length of the fiber.

Most of the polymeric foams have a rather limited service temperature window due to melting of the primary phase. When the fibers are made of polymeric material that has a high melt temperature (Tm1 in FIG. 2), and as the layer acts as insulation, the temperature Tm2 in the foam is significantly less than on the surface of pipe. First trials with polyethylene foams have shown that as the virgin PE-foam melts on a tube at 113° C., a tube protected with a fiber layer does not even stick to the pipe at this temperature.

In some cases either the foam or the pipe itself have been shown to discolor or even degrade. For example a polypropylene (PP) foam is known to degrade in the presence of Copper (Cu), so such product cannot be used to insulate Copper-pipings. Tests have shown that a virgin PP-foam around a Cu-pipe starts to degrade at 123° C. already after one day, whereas no sign of degradation is observed on the surface of fiber covered foam after two days. The results show that the resistance is improved significantly. The fibers provide an additional barrier between the Copper and polypropylene, and hence the degradation does not start.

Also in the presence of flame retardants, which are quite often used in insulation industry, some polymeric pipes may discolor (turn yellowish) due to chemical reaction at the interface. Also in this case the fibers provide additional protection to both ways.

Depending on the type of fiber, the fiber layer may vary from very soft and flexible to very hard and rough. In the case of soft and flexible layer, the layer provides much lower coefficient of friction and therefore makes it much easier to slide in the pipe. Furthermore, it may enable the end-user to use one size of insulation tube for two or more different sizes of pipes, decreasing the number of insulation tubes needed.

Example

A polyethylene tube having an internal diameter of 34 mm and a wall thickness of 10 mm is extruded using isobutene as a physical blowing agent. The product is cooled for one minute prior to on-line slitting (42), after which an adhesive is applied (44) using a specially designed die used for coatings. Immediately after applying (44) the adhesive, polyamide fibers of 22 dtex and 3 mm in length are electrostatically charged (45) using a suitable equipment. After curing of the adhesive the final step of the process, closing the tube, will be made using 350° C. hot-air nozzles to fuse the two sides back together. The final product, an internally fiber covered tube having an internal diameter of 28 mm and a wall thickness of 13 mm, with improved temperature resistance and thermal conductivity is packed in two meter tube pieces.

The invention claimed is:

1. A polymeric foam tube for pipe insulations, comprising:
   an external surface; and
   an internal surface being provided with an adhesively bonded additional layer, said additional layer being a layer of fibers which:
   comprise a material having a melt temperature that is higher than that of the polymeric foam,
   are adhesively bonded to the internal surface such as to stand up from the internal surface,
   are substantially uniformly distributed over the internal surface providing a surface coverage of 2 to 20 percent, and
   have a linear density of 0.5 to 25 dtex and a length of 0.2 to 5 mm.

2. A polymeric foam tube according to claim 1, wherein the fibers extend substantially in a radial direction from the internal surface.

3. A polymeric foam tube according to claim 1, wherein the fibers are polymeric fibers.

4. The tube of claim 1 wherein said surface coverage is 4 to 10 percent.

* * * * *